United States Patent [19]
Sri-Jayantha et al.

[11] Patent Number: 5,721,457
[45] Date of Patent: Feb. 24, 1998

[54] SHOCK ISOLATION SYSTEM WITH WRITE INHIBIT

[75] Inventors: Muthuthamby Sri-Jayantha; Vijayeshwar Khanna, both of Ossining; Arun Sharma, New Rochelle, all of N.Y.; Koji Kawabata, Kanagawa-ken, Japan; Jagdeep Tahliani, Norristown, Pa.

[73] Assignee: International Business Machines Corporation, Armonk, N.Y.

[21] Appl. No.: 430,655

[22] Filed: Apr. 28, 1995

[51] Int. Cl.$^6$ .................................................. H01H 35/00
[52] U.S. Cl. .............................. 307/119; 307/65; 307/66; 307/45; 369/263
[58] Field of Search ........................ 307/64, 65, 66, 307/45, 46, 82, 85, 86, 87, 119; 369/263, 246, 247, 248, 253, 75.1–75.2, 77.1–77.2, 191–194, 178, 34, 36, 38, 99.02, 99.06; 360/97.1

[56] References Cited

U.S. PATENT DOCUMENTS

| | | |
|---|---|---|
| 2,964,272 | 12/1960 | Olson . |
| 4,040,103 | 8/1977 | White . |
| 4,135,392 | 1/1979 | Young . |
| 4,692,915 | 9/1987 | Moriya et al. . |
| 4,862,298 | 8/1989 | Genheimer et al. .................. 360/60 |
| 4,947,093 | 8/1990 | Dunstam et al. . |
| 5,126,895 | 6/1992 | Yasuda et al. . |
| 5,182,739 | 1/1993 | Kime et al. .................. 369/44.15 |
| 5,227,929 | 7/1993 | Comerford . |
| 5,235,472 | 8/1993 | Smith . |
| 5,373,213 | 12/1994 | Smith .................................. 310/355 |
| 5,390,949 | 2/1995 | Naganathan et al. .................. 280/707 |
| B1 4,692,915 | 7/1988 | Moriya et al. . |

FOREIGN PATENT DOCUMENTS

| | | |
|---|---|---|
| 0 264 535 A2 | 4/1988 | European Pat. Off. . |
| 60-261 069 | 12/1985 | Japan . |
| 63-204580 | 8/1988 | Japan . |
| 63-257969 | 10/1988 | Japan . |

OTHER PUBLICATIONS

Servo Angular Accelerometer for Detection and Measurement. IBM Technical Disclosure Bulletin, vol. 36, No. 06A, Jun. 1993, p. 207.

Integretaged Micro–VCM Lock as Write Inhibit Generator. IBM Tech. Disclosure Bulletin, Vo. 35, No. 2, Jul. 1992, p. 207.

Apparatus For Detecting and Correcting Excessive Vibration in a Disk File. IBM Technical Disclosure Bulletin, vol. 30, No. 6, Nov. 1987, pp. 81–82.

*Primary Examiner*—Jonathan Wysocki
*Assistant Examiner*—Kim Lockett
*Attorney, Agent, or Firm*—David Aker; Stephen S. Strunck

[57] ABSTRACT

In a computer apparatus including an enclosure and a direct access storage device mounted within the enclosure, a mounting apparatus for the direct access storage device including: a plurality of a relatively rigid shock isolators and at least one stress sensor mounted in series with are of said shock isolators and disposed between the enclosure and the direct access storage device. The enclosure may include a user frame and the mounting apparatus may be disposed between the direct access storage device and the frame. There may be one stress sensor for each of the shock isolators. The shock isolators may be coupled to the direct access storage device. Each stress sensor may include a piezoelectric element. Preferably the shock isolators are rigid enough so that the resonant frequency of said mounting apparatus is at least 800 Hz, but can be 800 Hz or higher.

9 Claims, 4 Drawing Sheets

SHOCK ISOLATION SYSTEM WITH WRITE INHIBIT

FIELD OF THE INVENTION

This invention relates to shock isolation system for direct access storage devices. More particularly, it relates to a system of this kind which also provides a write inhibit signal under conditions of shock and vibration.

BACKGROUND ART

A conventional shock and vibration isolation system for a direct access storage device, such as a disk drive is illustrated in FIG. 1. A head disk assembly 10, including the mechanical components of the disk drive, is isolated from a frame 12 by a plurality of shock mounts 14. Also mounted to the frame 12 below the head disk assembly 10 is generally a printed circuit board (not shown) which contains the electronic components necessary for operation of the disk drive and for its interface to a host computer. The frame 12 generally is bolted to a chassis of the host computer.

Shock mounts 14 are generally formed from a compliant, visco-elastic material of relatively low stiffness. The head disk assembly, mounted on these mounts, generally has a resonant frequency in the order of 150 Hertz. This type of arrangement requires significant sway space and thickness of the shock mounts 14, and therefore increases the amount of space around the form factor of the disk drive necessary to receive the disk drive in a computer housing.

The arrangement illustrated in FIG. 1, even though using considerable space, often is not sufficient for preventing track misregistration between the head and a particular track of the disk in the head disk assembly 10. Such misregistration, if occurring during a write operation, leads to errors in the data stored on the disk. An approach that has been proposed for dealing with this problem is to mount an accelerometer in the head disk assembly. When the voltage output from the accelerometer, which is generally of low amplitude and requires amplification, exceeds a given threshold, a write inhibit logic signal is produced which inhibits the writing of information on the rotating disk. Thus, data on the disk is not corrupted and writing may be resumed after occurrence of the shock or vibration. Thus, while the shock isolators 14 are often sufficient to protect the head disk assembly 10 during non-operating shocks (those occurring when the head disk assembly is not operating), they are often insufficient to protect against shock during operation.

When disk drives are incorporated into smaller computers, such as laptop and notebook computers, space is at a premium. One approach is to simply remove the shock mounts. However, this leaves the head disk assembly vulnerable to non-operating shocks caused by roughness in handling and transporting the computer. The same problem exists with respect to so-called high-end disk drives used in redundant disk drive arrays. In that case, the challenge is to remove non-operating disk drives from the array without powering the array down and while the array is operating. Removal and insertion of a disk drive produces an amount of shock and vibration which may be sufficient to interfere with the operation of the other drives in the array. What is needed is an arrangement to protect the other operating drives from undue shock and vibration including that which occurs during operation.

SUMMARY OF THE INVENTION

It is a principal object of the invention to provide for mounting of a disk drive in a computer so as to isolate the disk drive from shock and vibration while minimizing the sway space needed to do so.

It is another object of the invention to provide for the generation of a relatively high amplitude write inhibit signal when the computer undergoes shock or vibration so as to prevent the data being altered by track misregistration.

In accordance with the invention, in a computer apparatus including an enclosure and a direct access storage device mounted within the enclosure, a mounting apparatus for the direct access storage device comprises: a plurality of relatively rigid shock isolators and at least one stress sensor in contact with one of the shock isolators and disposed between the enclosure and the direct access storage device. The enclosure includes a user frame and the mounting apparatus is disposed between the direct access storage device and the frame. There may be one stress sensor for each of the shock isolators. The shock isolators may be in direct contact with the direct access storage device and may include a piezoelectric element. Preferably the shock isolators are rigid enough so that the resonant frequency of the mounting apparatus is at least substantially 350 Hz, but preferably substantially 800 Hz.

DETAILED DESCRIPTION OF THE PREFERRED EMBODIMENT

Figure 1:
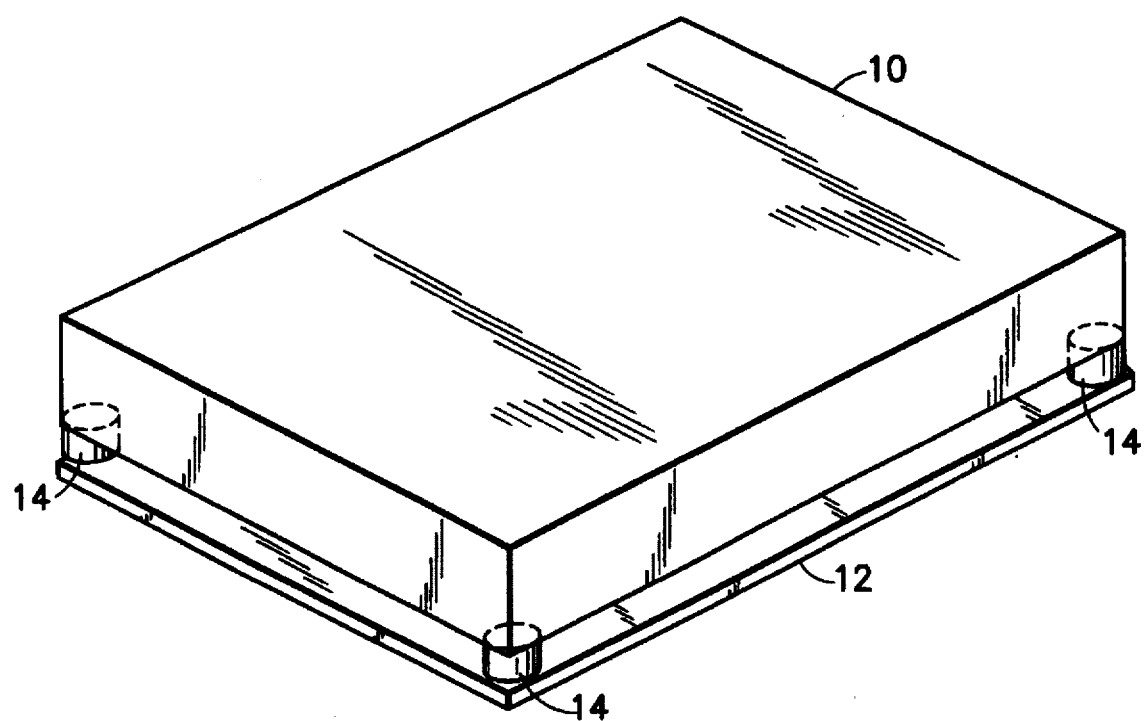
FIG. 1 is a perspective view of a prior art isolation system.
Figure 2:
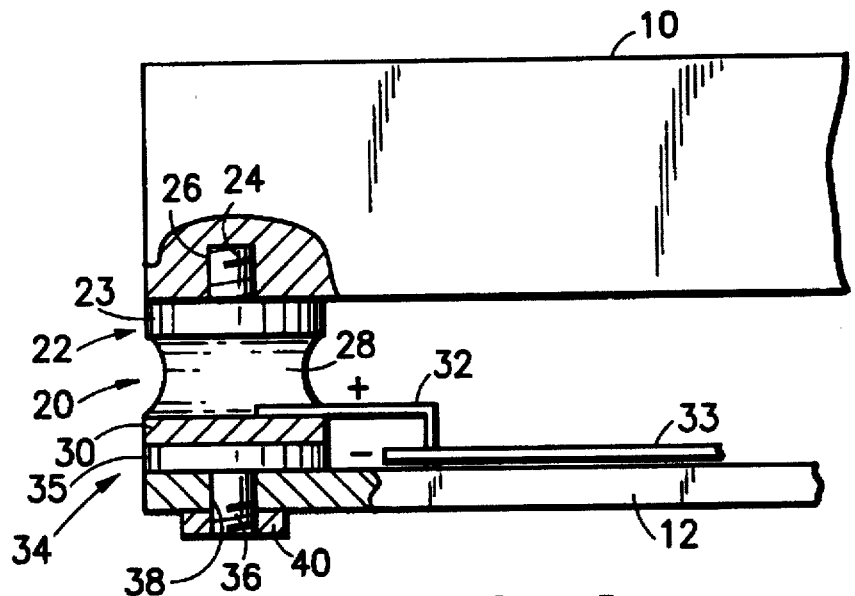
FIG. 2 is a partial side elevational view of a mounting arrangement in accordance with the invention.

Referring to FIG. 2 wherein like components have the same reference numerals as used in FIG. 1, the head-disk assembly 10 is coupled to the user frame 12 by shock and vibration isolator assemblies 20 which substitute for the shock mounts 14 in FIG. 1. Each assembly 20 includes a screw 22 with a large head 23. The threaded portion 24 of screw 22 is received in a threaded hole 26 formed in the housing of head disk assembly 10. An isolator 28 comprising a rather stiff, shock absorbing visco-elastic material is bonded to head 23 of screw 22 by any of several well known bonding techniques including the use of a small quantity of epoxy. A bottom planar surface of isolator 28 is bonded to the top surface of a piezoelectric transducer 30. Piezoelectric transducer 30 may be of the conventional type which is formed of a poled lead zirconate titanate (PZT) material that is coated on its planar surfaces with a conductive material, such as a thin metal coating. In this embodiment transducer 30 is excited in a shear mode. Provisions are made for an electrical conductor 32 to be placed between the bottom surface of isolator 28 and the top surface of transducer 30 so that electrical signals generated by transducer 30 can be picked up for further processing.

The bottom surface of transducer 30 is bonded to the head 35 of a screw 34, which is similar to screw 22. The threaded portion 36 of screw 34 extends through a clearance hole 38 in frame 12. Each assembly 20 of those that are used to secure head disk assembly 10 is affixed to frame 12 by a nut 40 threaded onto threaded portion 36 of screw 34.

While isolator 28 is affixed to screw 22 and transducer 30 is affixed to screw 34, it will be understood that the positions of isolator 28 and transducer 30 may be reversed. However, the arrangement in FIG. 2 is preferred in that electrical lead 32 is shorter and there is less motion due to shock and vibration of the interface between isolator 28 and transducer 30 than there would be between the interface of isolator 28 and screw 22, if the positions were reversed.

A key aspect of the present invention, and a marked improvement over the prior art use of accelerometers which produce signals of small amplitude such as several millivolts for accelerations on the order of 1 g, is that a very significant portion of the entire mass of the head disk assembly is supported by isolator assembly 20. This is due to isolator 28 and transducer 30 being mounted "in series" between head-disk assembly 10 and user frame 12. As a result, transducer 30 produces an output signal approximately two orders of magnitude larger than that produced with conventional accelerometers. As shown below with respect to FIG. 3, such signals can be directly processed without the need for a high impedance input amplifier.

Typical stiffness constants for isolators 20 are in the range of $0.8 \times 10^6$ Newtons/meter per isolator for four isolators assemblies 20 supporting a head-disk assembly having a mass of 140 grams for a resonant frequency of approximately 800 Hz. This range is particularly advantageous because it is relatively stiff as compared to those used in the prior art configuration of FIG. 1. Thus, the sway space needed, and therefore, the volume occupied in the host computer, can be greatly reduced. Thus, in addition to providing an inexpensive and sensitive way to monitor shock and vibration for purposes of inhibiting write operations, the present invention advantageously provides a mounting assembly requiring only a minimum sway space.

Figure 3:
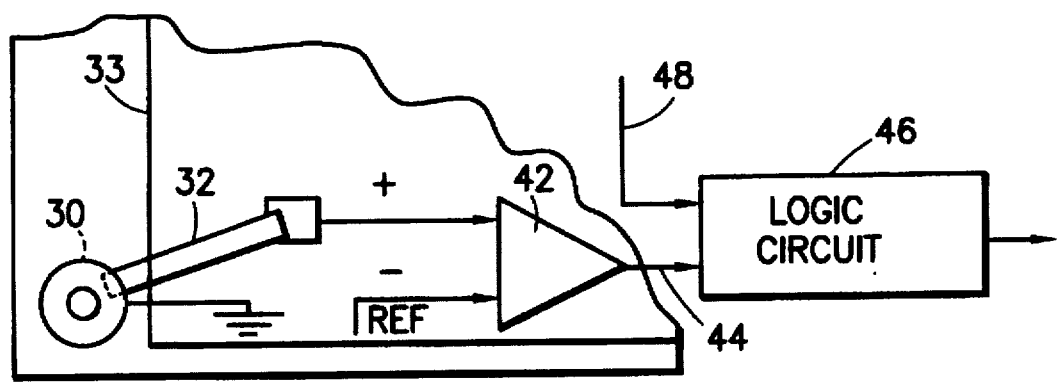
FIG. 3 is a schematic diagram illustrating the acquisition and use of the signals produced by the arrangement of FIG. 2.

Referring to FIG. 3, the output of transducer 30 is connected directly to a non-inverting input of a voltage comparator 42. The inverting input is connected to a reference threshold voltage. Any significant amount of acceleration causes transducer 30 to generate a signal sufficient in amplitude to trigger comparator 42 directly, thus producing a logic output on line 44 which can be used by a logic circuit 46 to regulate operation of the head disk assembly. More specifically, the write process may be suspended at any time that a significant acceleration is experienced by the head disk assembly. Logic circuit 46 can also be provided with another input 48 from another transducer 30 to permit recognition of angular accelerations, as more fully described below.

Transducer 30 may be poled in any direction so that it has maximum sensitivity for shear stress. Transducer 30 may be oriented with respect to head disk assembly 10 so as to produce maximum sensitivity for shock and vibration in a particular direction.

Figure 4:
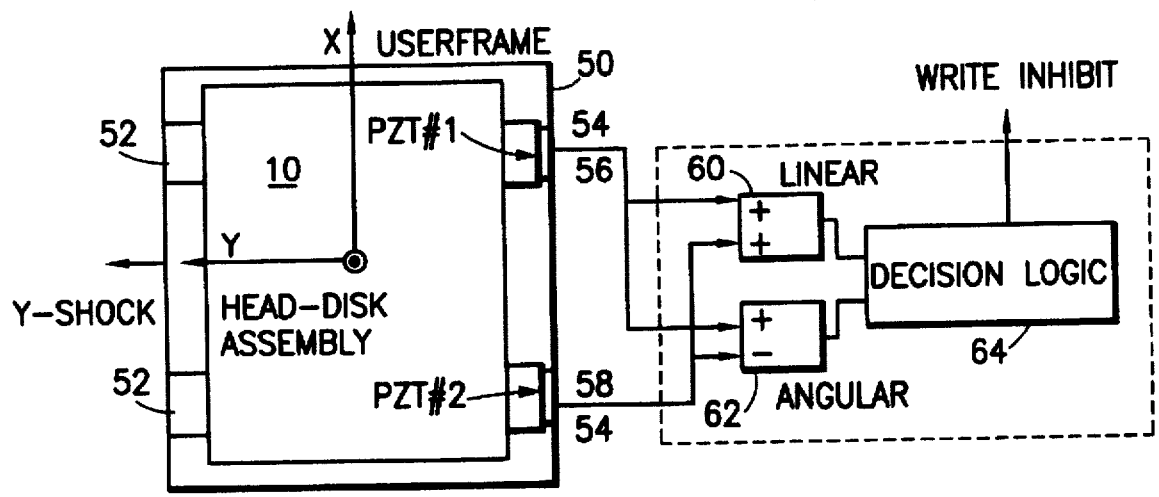
FIG. 4 is an alternate embodiment of the invention.

Referring to FIG. 4, a head disk assembly 10 is mounted in a compartment of a host computer 50 by two conventional isolators 52 and two isolator assemblies 54 in accordance with the present invention. In this embodiment, shock and vibration excite transducers 56 and 58 in a compressive mode, as opposed to the shear mode of transducer 30 (FIG. 2). This arrangement is particularly sensitive to shock and vibration in the Y direction (horizontal in FIG. 4). The output of each transducer 56 and 58 is connected to one input of each of a summing network 60 and a subtraction network 62. The output of summing network 60 provides a particularly sensitive indication of linear shock or vibration transmitted to the head disk assembly 10 in the Y direction. The output of subtraction network 62 provides an indication of shock or vibration which causes an angular rotation of the head disk assembly 10 about an axis normal to the plane of the head disk assembly 10 (that is, about the Z axis). The outputs of summing network 60 and subtraction network 62 are provided to decision logic 64 which processes the inputs in a predetermined manner to determine when a write inhibit command is appropriate.

Figure 5:
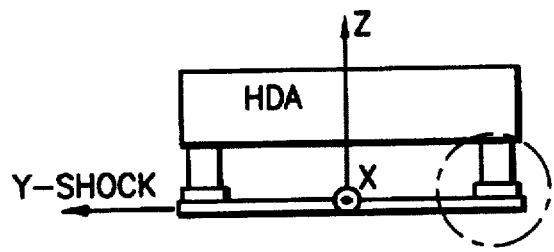
FIG. 5 illustrates details of the embodiment of the invention of FIG. 2.
Figure 5A:
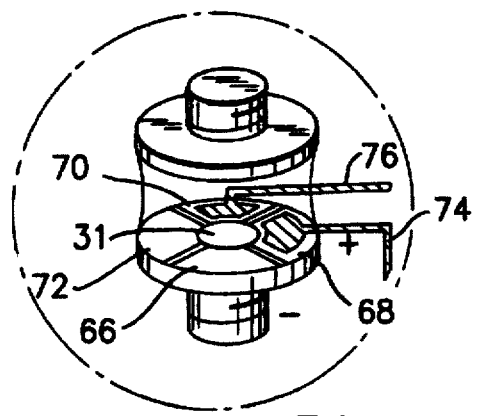
FIG. 5A illustrates further details of a portion of FIG. 5.

Referring to FIG. 5 and FIG. 5A, in another embodiment of the present invention, as in the embodiment of FIG. 2, only one of the mounting assemblies need be constructed in accordance with the invention. The remainder may be conventional. However, as illustrated in FIG. 5A, transducer 30 may be radially poled and divided into a number of electrically independent segments. For example, transducer 30 may be a disk having a central hole 31 and segmented conductors to create electrically independent sectors 66, 68, 70 and 72. The underside of transducer 30 may be covered with a common electrode in a manner similar to transducer 30 of FIG. 2. Segment 68 may be electrically connected to a first electrical conductor 74 while segment 70 is connected to a second electrical conductor 76. If these are oriented properly with respect to head disk assembly 10, and transducer 30 is radially poled, one segment will be sensitive to vibration in the X direction while the other segment is sensitive to vibration in the Y direction. The signals from conductors 74 and 76 may also be combined by some decision logic (not shown) to indicate a write inhibit operation is required. For example, it may be desirable to have write inhibit occur at a lower acceleration in one direction than in the other, or write inhibit can be caused to occur when some combination of the magnitude of these accelerations exceeds a predetermined level. For example, the resultant acceleration could be the square root of the sum of the squares of the magnitudes of acceleration in the X and Y directions (in the X-Y plane).

Figure 6:
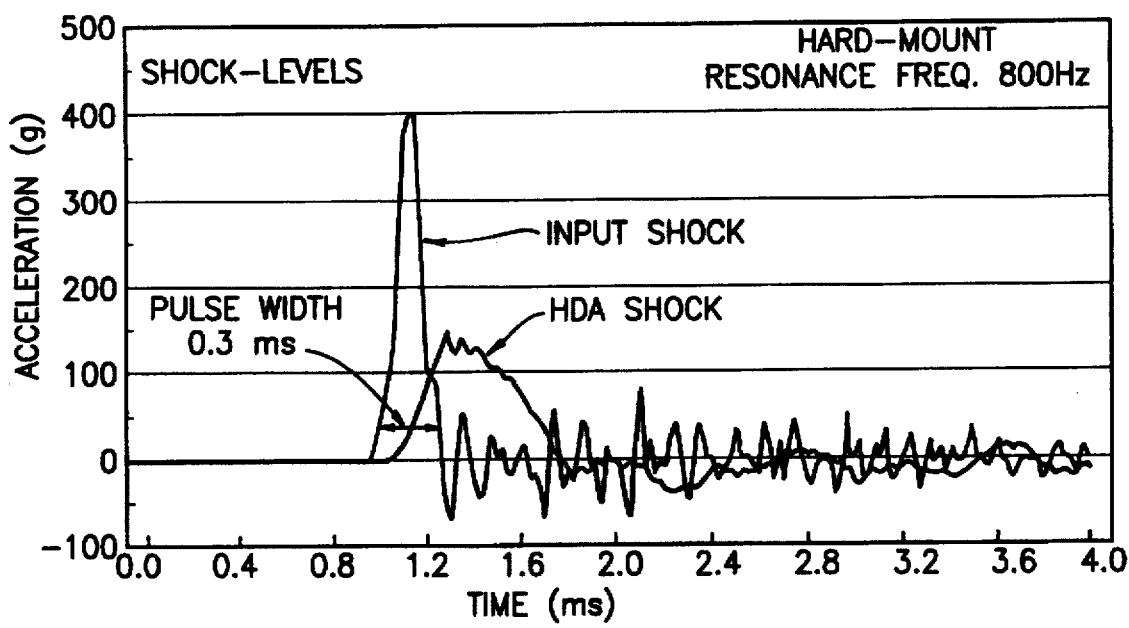
FIG. 6 is a graph of acceleration as a function of time for a mounting configuration in accordance with the invention.
Figure 7:
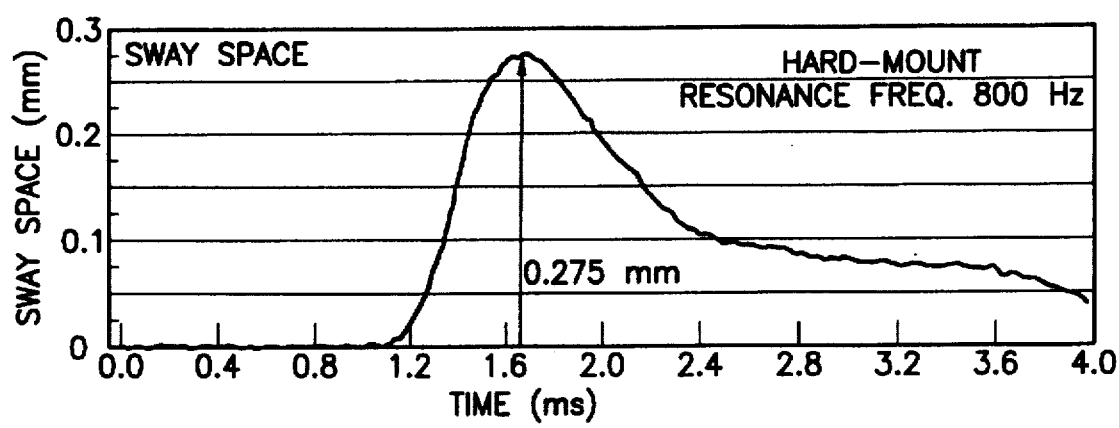
FIG. 7 is a graph of relative displacement of the head disk assembly with respect to the mounting frame as a function of time for the shock input illustrated in FIG. 6.

Referring to FIGS. 6 and 7, if the hardness of isolators 28 is selected so that the resonance frequency of the system of the head disk assembly 10 and the isolators 28 is approximately 800 Hertz, if an input shock and acceleration of 400 g, having a pulse width of 0.3 milliseconds is applied, the head disk assembly will experience an acceleration of only approximately one third of that value over a slightly longer time. As illustrated in FIG. 7, this is achieved with a sway space of less than 0.3 millimeters which is much smaller than can be achieved with the conventional mounting arrangement of the prior art (FIG. 1). Of course, the conventional mounting with substantially lower stiffness would have produced much lower shock levels at the head disk assembly. However, newer generations of head disk assemblies are robust and do not warrant this level of isolation.

Thus, the present invention provides a mounting structure that produces large signals which can be directly processed without amplification to achieve a write inhibit operation and does so within a minimum sway space, thus permitting the disk drive to occupy a minimal volume within the host computer.

We claim:

1. In a computer apparatus including an enclosure and a direct access storage device mounted within said enclosure, a shock isolation system for said direct access storage device comprising a plurality of shock isolators located between said enclosure and said direct access storage device, each of said isolators comprising a stiff, shock absorbing visco-elastic material bonded to said enclosure and said direct access storage device, wherein at least one of said isolators further includes a stress sensor interposed between said visco-elastic material and one of said enclosure and the direct access storage device.

2. The apparatus of claim 1 wherein said enclosure includes a user frame and said shock isolation system is disposed between said direct access storage device and said frame.

3. The apparatus of claim 1 wherein each of said shock isolators includes a stress sensor.

4. The apparatus of claim 1 wherein said stress sensor includes a piezoelectric element.

5. The apparatus of claim 4 wherein said piezoelectric element is radially poled.

6. The apparatus of claim 5 wherein said piezoelectric element has a segmented electrode to provide signals indicative of the direction of the shock.

7. The apparatus of claim 1 wherein said shock isolators are rigid enough so that the resonant frequency of said mounting apparatus is at least substantially 350 Hz.

8. The apparatus of claim 1 wherein at least two of said shock isolators have a stress sensor which isolators are mounted between said direct access storage device and said enclosure such that shock or vibration excite said at least two shock isolators thereby producing an electrical signal from each of said at least two shock isolators and further comprising an electronic arrangement for producing a write inhibit signal to inhibit a write operation of said direct access storage device in response to selected values of said electrical signal from said at least two stress sensors.

9. The apparatus of claim 8 wherein said logic arrangement includes an adder for adding said electrical signals, a subtractor for subtracting said electrical signals; and a decision logic block responsive to output from said adder and said subtractor for providing said write inhibit signal.

* * * * *